(12) United States Patent
Ahuja et al.

(10) Patent No.: US 10,671,577 B2
(45) Date of Patent: Jun. 2, 2020

(54) MERGING SYNONYMOUS ENTITIES FROM MULTIPLE STRUCTURED SOURCES INTO A DATASET

(71) Applicant: International Business Machines Corporation, Armonk, NY (US)

(72) Inventors: Shilpi Ahuja, San Jose, CA (US); Sheng Hua Bao, San Jose, CA (US); Rashmi Gangadharaiah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 15/273,959

(22) Filed: Sep. 23, 2016

(65) Prior Publication Data
US 2018/0089300 A1 Mar. 29, 2018

(51) Int. Cl.
*G06F 16/215* (2019.01)
(52) U.S. Cl.
CPC ................. *G06F 16/215* (2019.01)
(58) Field of Classification Search
CPC ....................................................... G06F 17/30
See application file for complete search history.

(56) References Cited

U.S. PATENT DOCUMENTS

| | | | | |
|---|---|---|---|---|
| 5,926,812 A * | 7/1999 | Hilsenrath | ............ | G06F 16/355 707/737 |
| 7,076,484 B2 * | 7/2006 | Dworkis | ................ | G06F 16/338 |
| 8,229,733 B2 | 7/2012 | Harney et al. | | |
| 8,442,972 B2 * | 5/2013 | Ismalon | ............ | G06F 16/24578 707/721 |
| 8,463,806 B2 * | 6/2013 | Loritz | ................ | G06F 16/3338 707/767 |
| 8,533,203 B2 * | 9/2013 | Chaudhuri | ............ | G06F 40/295 707/749 |
| 8,606,826 B2 | 12/2013 | Datta | | |

(Continued)

FOREIGN PATENT DOCUMENTS

JP 2007233446 A 9/2007

OTHER PUBLICATIONS

McCrae, John, and Nigel Collier. "Synonym set extraction from the biomedical literature by lexical pattern discovery." BMC bioinformatics 9.1 (2008), 13 pages.

(Continued)

*Primary Examiner* — Mariela Reyes
*Assistant Examiner* — Edward Jacobs
(74) *Attorney, Agent, or Firm* — Will Stock; SVL IP Law Edell, Shapiro & Finnan, LLC

(57) ABSTRACT

Merging synonymous entities from multiple structured sources into a dataset includes receiving a first set of paired terms from a first authoritative source for a domain and a second set of paired terms from a second authoritative source for the domain. The first set of paired terms is compared to the second set of paired terms with a similarity assessment based on a clustering statistical algorithm to identify paired terms from the first set of paired terms that share a synonymous term with one or more paired terms from the second set of paired terms. The paired terms associated with the synonymous term are merged and a dataset is generated that associates a normalized version of the synonymous term with any terms included in the merged paired terms.

15 Claims, 6 Drawing Sheets

(56) References Cited

U.S. PATENT DOCUMENTS

| | | | |
|---|---|---|---|
| 8,738,643 B1 | 5/2014 | Czuba et al. | |
| 8,762,370 B1 | 6/2014 | Grushetskyy et al. | |
| 8,798,988 B1* | 8/2014 | Upstill | G06F 40/58 |
| | | | 704/9 |
| 8,812,541 B2* | 8/2014 | Ismalon | G06F 16/9535 |
| | | | 707/769 |
| 9,171,065 B2* | 10/2015 | Raghavan | G06F 16/3328 |
| 9,183,297 B1* | 11/2015 | Baker | G06F 16/951 |
| 9,239,823 B1* | 1/2016 | Upstill | G06F 40/20 |
| 9,934,465 B2* | 4/2018 | Hunt | G06F 16/84 |
| 10,002,325 B2* | 6/2018 | Sweeney | G06N 5/02 |
| 2003/0058277 A1* | 3/2003 | Bowman-Amuah | |
| | | | G06F 16/289 |
| | | | 715/765 |
| 2007/0011154 A1* | 1/2007 | Musgrove | G06F 16/3338 |
| 2008/0091670 A1* | 4/2008 | Ismalon | G06F 16/3322 |
| 2008/0109416 A1 | 5/2008 | Williams | |
| 2008/0114721 A1* | 5/2008 | Jones | G06F 16/3338 |
| 2009/0006359 A1 | 1/2009 | Liao | |
| 2009/0055386 A1* | 2/2009 | Boss | G06F 16/3338 |
| 2010/0042576 A1* | 2/2010 | Roettger | G06F 40/194 |
| | | | 706/55 |
| 2010/0293179 A1* | 11/2010 | Chaudhuri | G06F 16/951 |
| | | | 707/759 |
| 2012/0253790 A1* | 10/2012 | Heck | G06F 16/9535 |
| | | | 704/9 |
| 2012/0317125 A1* | 12/2012 | Bao | G06F 16/367 |
| | | | 707/749 |
| 2013/0006975 A1* | 1/2013 | Li | G06F 40/247 |
| | | | 707/723 |
| 2013/0232129 A1* | 9/2013 | Cheng | G06F 16/3338 |
| | | | 707/706 |
| 2013/0282710 A1* | 10/2013 | Raghavan | G06F 16/838 |
| | | | 707/728 |
| 2013/0323690 A1* | 12/2013 | Gandhe | G09B 17/00 |
| | | | 434/167 |
| 2014/0040727 A1* | 2/2014 | Bao | G06Q 30/0641 |
| | | | 715/234 |
| 2014/0358904 A1* | 12/2014 | Nayak | G06F 16/951 |
| | | | 707/723 |
| 2015/0006519 A1* | 1/2015 | Jain | G06F 11/3636 |
| | | | 707/723 |
| 2015/0261850 A1* | 9/2015 | Mittal | G06F 16/3344 |
| | | | 707/724 |
| 2016/0224574 A1* | 8/2016 | Horvitz | G06F 16/332 |
| 2016/0224666 A1* | 8/2016 | Horvitz | G06F 16/951 |
| 2017/0046393 A1* | 2/2017 | Pedersen | G06Q 50/184 |
| 2017/0046425 A1* | 2/2017 | Tonkin | G06F 16/367 |
| 2018/0047080 A1* | 2/2018 | Piccus | G06F 8/20 |

OTHER PUBLICATIONS

Yu, Hong, et al. "Automatic extraction of gene and protein synonyms from MEDLINE and journal articles." Proceedings of the AMIA Symposium. American Medical Informatics Association, 2002, 5 pages.

Turney, Peter D., and Patrick Pantel. "From frequency to meaning: Vector space models of semantics." Journal of artificial intelligence research 37.1 (2010), 48 pages.

Van der Plas, Lonneke, and Jörg Tiedemann. "Finding synonyms using automatic word alignment and measures of distributional similarity." Proceedings of the COLING/ACL on Main conference poster sessions. Association for Computational Linguistics, 2006, 8 pages.

Pantel, Patrick, Andrew Philpot, and Eduard Hovy. "Matching and integration across heterogeneous data sources." Proceedings of the 2006 international conference on Digital government research. Digital Government Society of North America, 2006, 4 pages.

Warren Shen, Xin Li, and AnHai Doan. "Constraint-based entity matching." AAAI 2005, 6 pages.

McCallum, Andrew, Kamal Nigam, and Lyle H. Ungar. "Efficient clustering of high-dimensional data sets with application to reference matching." Proceedings of the sixth ACM SIGKDD international conference on Knowledge discovery and data mining. ACM, 2000, 10 pages.

Hernández, Mauricio A., and Salvatore J. Stolfo. "The merge/purge problem for large databases." ACM Sigmod Record. vol. 24. No. 2. ACM, 1995, 12 pages.

Hisamitsu et al., "Extracting useful terms from parenthetical expressions by combining simple rules and statistical easures", Recent Advances in Computational Terminology, John Benjamins Publishing Company, Amsterdam/Philadelphia, 2001, pp. 209-224.

* cited by examiner

US 10,671,577 B2

MERGING SYNONYMOUS ENTITIES FROM MULTIPLE STRUCTURED SOURCES INTO A DATASET

BACKGROUND

Present invention embodiments relate to data processing systems, and more specifically, to techniques for merging, with a data processing system, identified synonymous data from multiple data sources and generating a dataset for merged terms related to the synonymous data.

Data processing and analysis systems are being implemented across many fields to facilitate research and improve efficiency (e.g., to improve the speed and precision of research and development by streamlining a process for testing a hypothesis). In order to implement these systems, a knowledge base must be created by aggregating data from a large number of data sources. However, many fields or sectors (e.g., domains, like a life science domain) use multiple words or phrases to refer to the same object, item, entity, etc. This may create confusion and/or inaccuracies. This is particularly true in the life sciences domain, since life science data is vast, scattered, and typically lacks global identifiers. For example, drugs or diseases may have multiple names, but may not have a global identifier. Consequently, in data processing systems, query results across databases may be inaccurate, inefficient, and generally unhelpful.

SUMMARY

According to one embodiment of the present invention, merging synonymous entities from multiple structured sources into a dataset includes receiving a first set of paired terms from a first authoritative source for a domain and a second set of paired terms from a second authoritative source for the domain. The first set of paired terms is compared to the second set of paired terms with a similarity assessment based on a clustering statistical algorithm to identify paired terms from the first set of paired terms that share a synonymous term with one or more paired terms from the second set of paired terms. The paired terms associated with the synonymous term are merged and a dataset is generated that associates a normalized version of the synonymous term with any terms included in the merged paired terms.

BRIEF DESCRIPTION OF THE DRAWINGS

Generally, like reference numerals in the various figures are utilized to designate like components.

DETAILED DESCRIPTION

Figure 1:
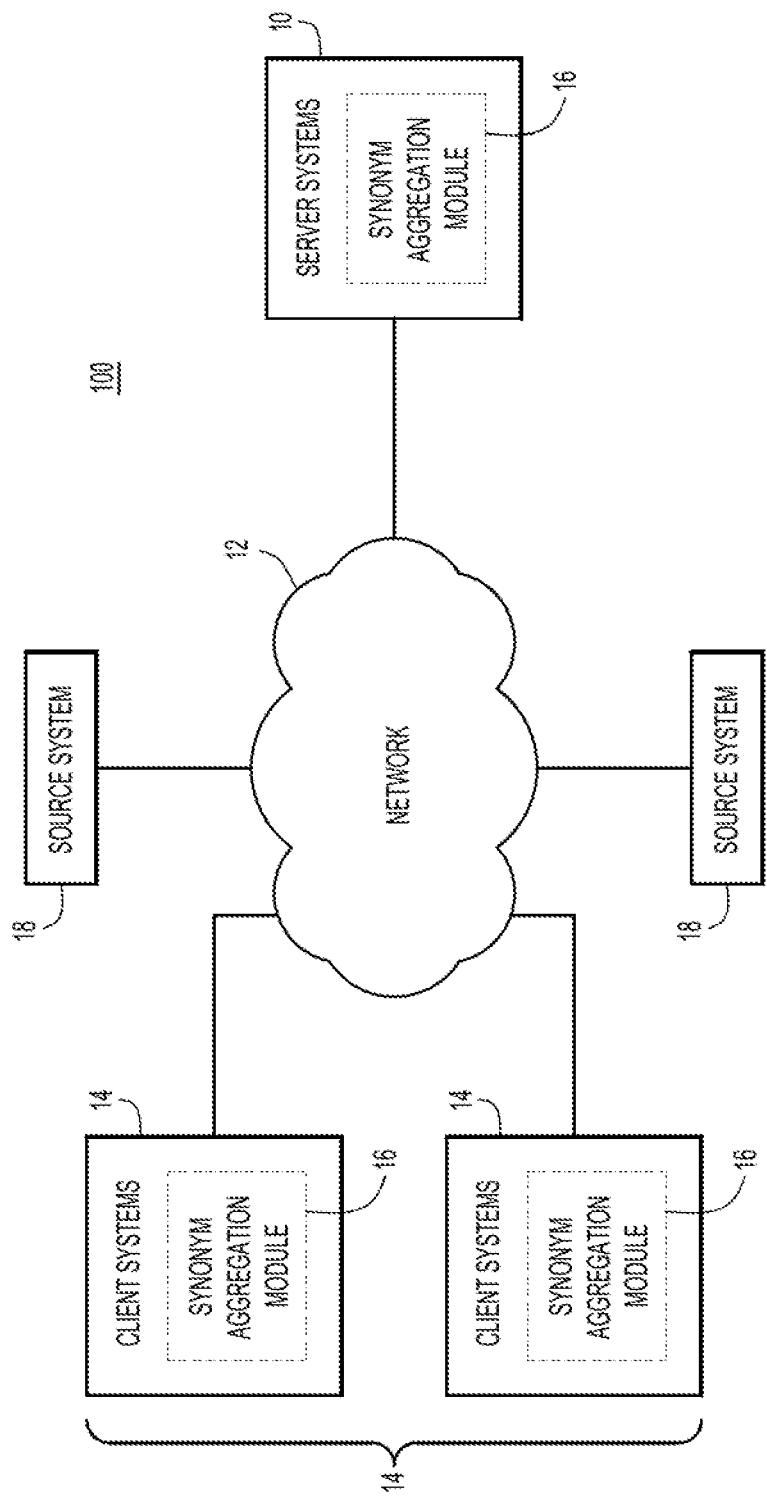
FIG. 1 illustrates an example environment in which the present general inventive concept can be embodied.

Presented herein are techniques for merging synonymous entities from multiple structured sources. Generally, the techniques provided herein group synonymous terms together across multiple data sources in the absence of unique identifiers. This may be particularly useful in a life science domain, since many life science databases store data without unified global identifiers (although the International Union of Pure and Applied Chemistry (IUPAC) provides naming recommendations, such as ChEMBL identifications or DrugBank identifications, these recommendations are not always followed). By comparison, data sources concerned with people may utilize a social security number as a global identifier while data sources concerned with objects may use other such global identifiers, such as an International Standard Book Number (ISBN), to uniquely identify a person or object.

As is explained in further detail below, a clustering statistical algorithm is used to identify paired terms from authoritative sources that are similar and then merge these terms as synonyms. Advantageously, in at least some embodiments, similarities can be identified between entity pairs by only analyzing synonym-canonical name pairs. Additional attributes can provide additional knowledge but are not a requirement to determine similarity. Once similar entity pairs are merged into groups, a dataset is generated that stores the terms included in the merged entity pairs in association with a normalized version of a synonymous term found in the entity pairs. In other words, the terms included in merged paired terms are normalized to a common term representative of a particular entity.

Without this normalization, a user would have to search across all possible synonyms to find relevant documents mentioning a particular entity. Alternatively, a user could attempt to utilize other data aggregation techniques, but, unfortunately, many of these techniques may produce erroneously associated data that may cause an erroneous result (e.g., when testing a hypothesis). For example, techniques based on common chemical structures, common synonyms, relationships often rely on data sources that are created by humans who may not be domain experts and, thus, may be based on false or incorrect relationships. These techniques may also be expensive, laborious, and time-consuming. Moreover, many entity matching techniques simply fail to identify synonyms in scenarios with ambiguous synonyms (e.g., "RA" could be "Rheumatoid Arthritis" or "Refractory Anemia"), with minimal criteria information available, and with a lack of unique identifiers. Still further, many schema-mapping approaches concentrate on mapping columns across different databases, but do not group entries within columns based on synonymy.

Additionally, the techniques herein only identify candidate synonyms present in existing structured data sources using contextual information from unstructured data. In other words, candidates terms (or paired terms) are determined apriori. By comparison, other techniques may attempt to find synonyms using text-mining approaches based on rules, patterns, contextual information, and/or word-alignment strategies to find synonymous terms from unstructured data, but require that all synonyms be known prior to identifying synonyms. Among other pitfalls, this may result in merging based on other semantic-relations, such as an antonym relationship.

An example environment for use with present invention embodiments is illustrated in FIG. 1. Specifically, the environment includes one or more server systems 10, and one or more client or end-user systems 14. The server systems 10 and client systems 14 are each described in further detail below in connection with FIG. 5; however, generally, server systems 10 and client systems 14 may be remote from each other and communicate over a network 12. The network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In the present invention embodiment depicted in FIG. 1, the server system 10 includes a synonym aggregation module 16; however, as shown in dashed lines, in other embodiments, the synonym aggregation module 16 may also be disposed, either entirely or partially, on the client systems 14. Synonym aggregation module 16 may include one or more modules or units to perform the various functions of present invention embodiments. As is described in further detail below, the synonym aggregation module 16 is generally configured to identify synonyms and generate a dataset with merged terms that are identified as synonyms. In at least some embodiments, the client systems 14 may present a graphical user interface (e.g., GUI, etc.) or other such user interface to allow a user to upload a set of data to the server systems 10 so that synonyms can be identified and a dataset of merged terms can be generated.

Still referring to FIG. 1, the network environment 100 may also include one or more source systems 18 that may store or provide various information for the synonym aggregation module 16 (e.g., different knowledge bases for a particular domain). The source system 18 may be implemented by any conventional or other system, such as a database or storage unit, may be local to or remote from server systems 10 and client systems 14, and may communicate via any appropriate communication medium (e.g., local area network (LAN), wide area network (WAN), Internet, hardwire, wireless link, Intranet, etc.).

Figure 2:
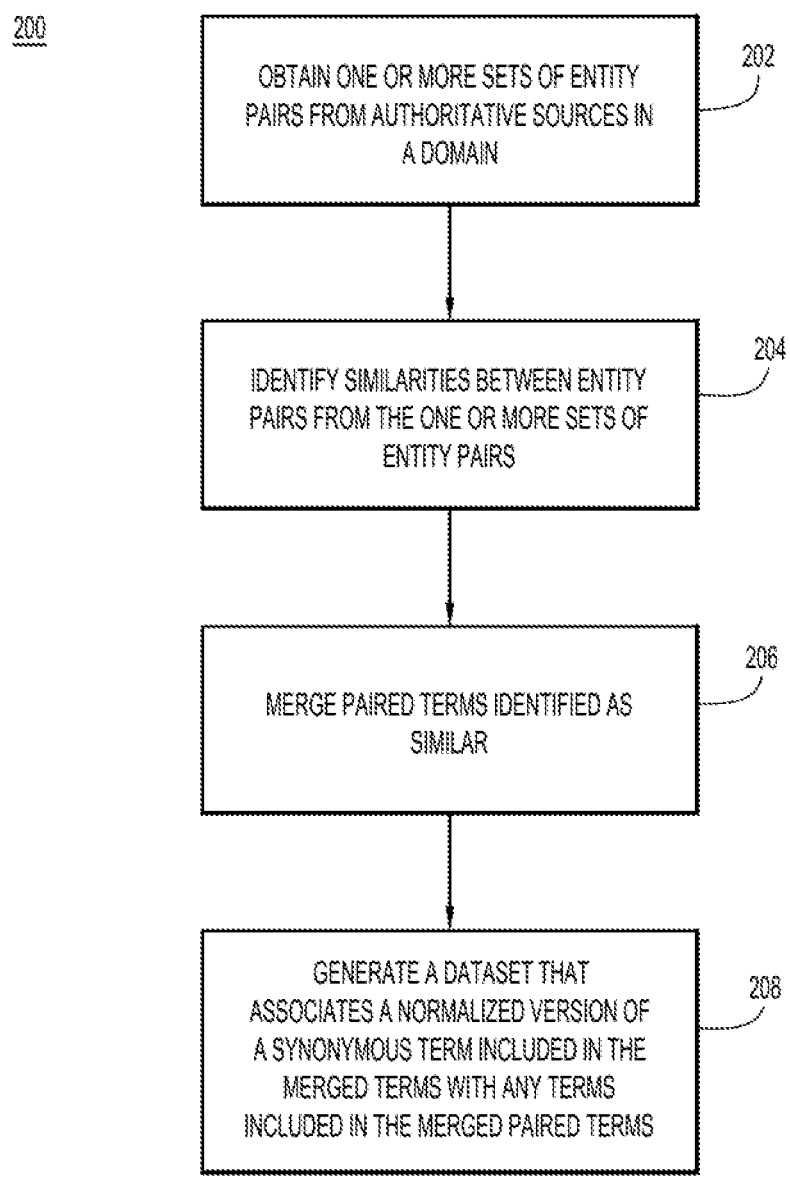
FIG. 2 is a procedural flow chart of merging synonymous entities from multiple structured sources into a dataset, according to a present invention embodiment.

With reference now to FIG. 2, procedural flow chart 200 depicts operations (e.g., of synonym aggregation 16) for identifying or detecting synonymous terms and generating a dataset for merged synonymous terms. Initially, at step 202, one or more sets of entity pairs are obtained from authoritative sources (e.g., information provided from a reliable source) for a particular domain. Each entity pair included in the one or more sets includes two names (e.g., a synonym and a canonical name). In at least some embodiments, the data source may only provide a set of entity pairs without any other attributes or information and, thus, only the entity pairs may be obtained. Alternatively, a data source may include additional attributes that may also be obtained for each entity pair included therein. The additional attributes can provide additional knowledge, but are not a requirement for the techniques provided herein. However, preferably, the paired entities are not associated with a unique identifier (since the presence of a unique identifier may render the techniques presented herein unnecessary).

In at least some embodiments, each set of entity pairs may be obtained from a unique source (such as clinical trial databases). As an example, a first set of entity pairs may be obtained from a first authoritative source including the following entity pairs (with each row comprising an entity pair):

| NAME | SYNONYM |
| --- | --- |
| RA | Rheumatoid Arthritis |
| RA | Neutropenia Rheumatoid |
| Refractory Anemia | Aplastic Anemia |

Meanwhile, a second set of entity pairs may be obtained from a second authoritative source including the following entity pairs (with each row comprising a pair):

| NAME | SYNONYM |
| --- | --- |
| Arthritis | Felty Syndrome |
| Refractory Anemia | Myelodyplastic Syndrome |
| Refractory Anemia | RA |
| Anemia | Non-regenerative Anemia |

As another example, a first set of entity pairs from the life science domain could include the following entity pairs of pharmaceutical names (with each row comprising a pair):

| NAME | SYNONYM |
| --- | --- |
| Amlodipine | Amlodis |
| Amlodipone | Coroval |
| Amlodipin | Lotrel |

While a second set of entity pairs may be obtained from a second source for pharmaceutical names including the following entity pairs (with each row comprising a pair):

| NAME | SYNONYM |
| --- | --- |
| Lotensin | Benezepril HCL |
| Lotensin | Lobopol |
| Lotrel | Benezapral |
| Amlor | Amvaz |

At step 204, one or more similarities are detected between entity pairs. The similarities are detected based on a similarity assessment that utilizes a pair-based similarity detection and clustering algorithm (referred to herein as a similarity algorithm), which is described in more detail below in connection with FIGS. 3A, 3B, and 4. However, generally, the similarity algorithm identifies synonymous entities based on synonym-canonical pair information from data sources. In other words, entity features and machine learning or other classifiers can be used to group synonymous entities. Consequently, once the machine learning techniques are trained based on large, available, hand-curated datasets containing synonym-canonical names (such as ChEMBL and PubChem, for Chemicals and Drugs and UMLS for diseases), similarities may be identified apriori with only synonym-canonical name pairs. In some embodiments, additional attributes can provide additional knowledge, but these attributes are not a requirement for the algorithm.

Put another way, the similarity algorithm identifies overlapping synonyms to create groups with high similarities, while also resolving any ambiguities. For example, in the first example above, entity pairs including or related to "Arthritis" (e.g., RA, Rheumatoid Arthritis, Neutropenia Rheumatoid, and Felty Syndrome) may be associated as synonyms, but all of the paired terms including "RA" are not associated as synonyms since RA refers to two distinct concepts (Arthritis and Anemia). Similarly, in the second example included above, entity pairs including the term Lotrel may be determined to be synonyms, but it may not be appropriate to associate other terms as synonyms (even if the edit distance is close).

At step 206, the terms included in the paired terms identified as similar (e.g. paired terms with synonymous terms) are merged into a group. Thus, at least RA, Neutropenia Rheumatoid, Felty Syndrome, and Rheumatoid Arthritis may be merged into a group for the first example while Benezapral, Lotrel, and Amlodipin may be merged into a group in the second example. In this group, all synonymous terms are represented by a normalized data element that is representative member of the cluster: For example, the terms Rheumatoid Arthritis, Neutropenia Rheumatoid, Felty Syndrome, and RA may be normalized to the representative name Rheumatoid Arthritis.

Then, at step 208, a dataset may be generated to store the groups and the associations with a particular synonym (e.g., Arthritis or Lotrel). Consequently, if, during data analysis, a query is performed for Arthritis or Lotrel, results associated with any synonym may be automatically returned by consulting the generated dataset and processing the query accordingly. Similarly, a query for any term associated with the normalized synonym may return results associated with all of the terms included in the group. Without this dataset, a user would have to search across all possible synonyms to find relevant documents mentioning that entity, increasing the time required to resolve the query and the operational burden on the data processing system. In other words, once data is reconciled and normalized, the query results are substantially improved, providing more value to the end-user and the data processing system.

Figure 3A:
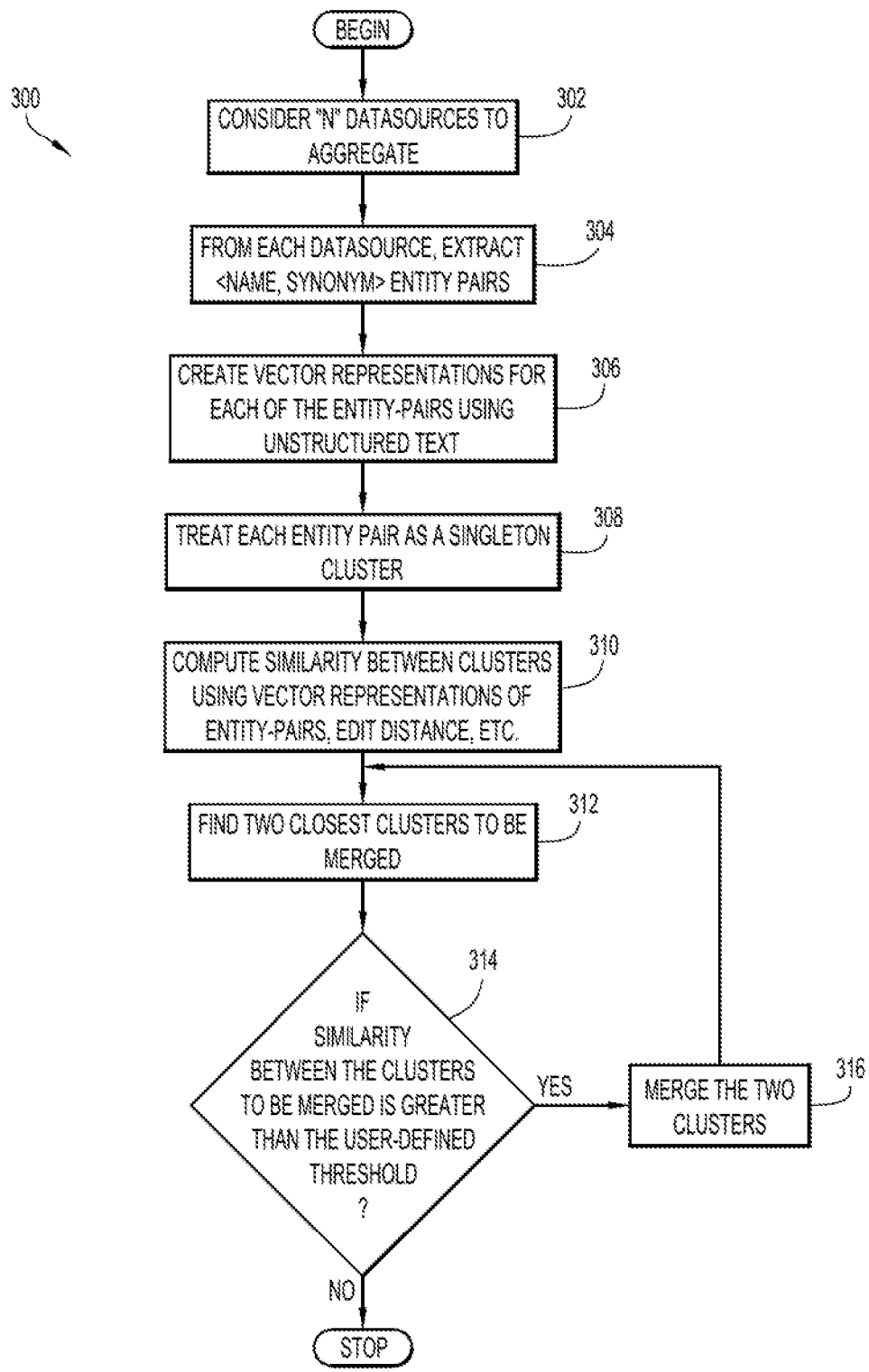
FIGS. 3A-3B are flow diagrams illustrating operations for identifying and merging synonymous entities from multiple structured sources into a dataset, according to a present invention embodiment.
Figure 3B:
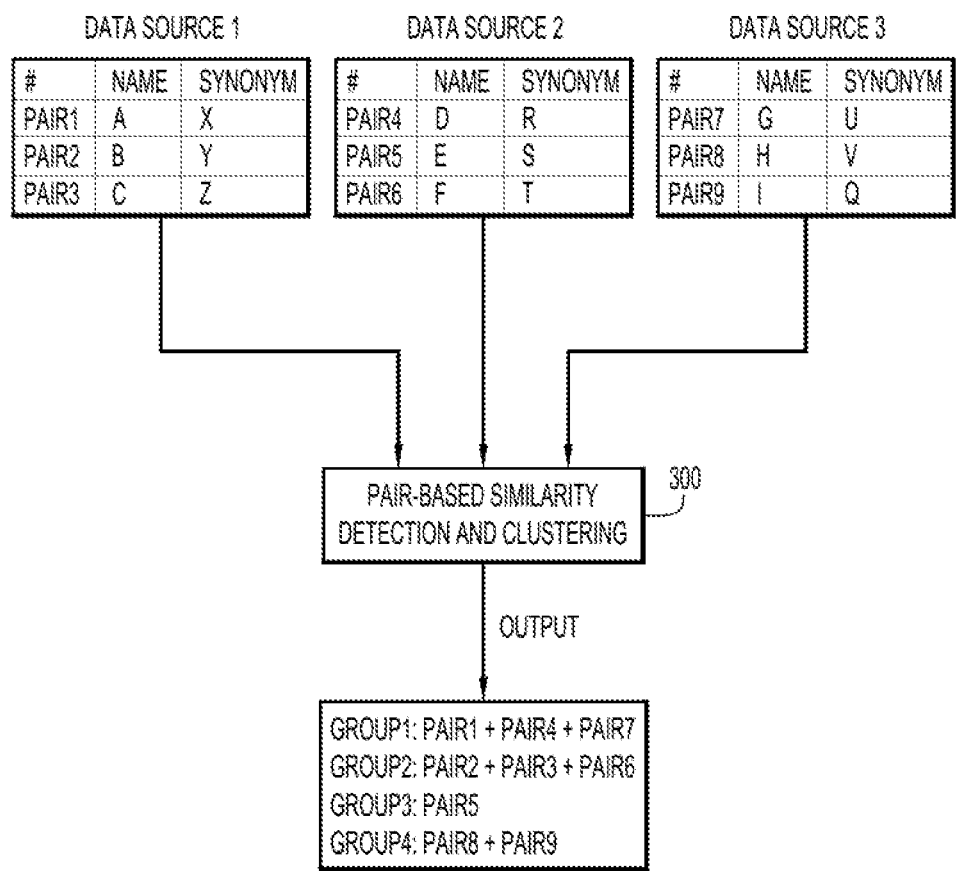

Now referring to FIGS. 3A-3B for a description of a method 300 for merging synonymous entities from multiple structured sources into a dataset, according to a present invention embodiment. Initially, at step 302, a group of data sources (e.g., 1 to n data sources, etc.) are considered for aggregation, and entity pairs are extracted from each data source (e.g., <name, synonym>) at step 304. Features are extracted for each entity included in sets of entity pairs across multiple authoritative data sources at step 306 (e.g., Source1, Source2, and Source3 (FIG. 3B)). For example, Source1 may include three entity pairs: (1) Pair 1, with terms A and X; (2) Pair 2 with terms B and Y; and (3) Pair 3, with terms C and Z. Meanwhile, Source2 may include three entity pairs: (1) Pair 4, with terms D and R; (2) Pair 5 with terms E and S; and (3) Pair 6, with terms F and T and Source3 may include three entity pairs: (1) Pair 7, with terms G and U; (2) Pair 8 with terms H and V; and (3) Pair 9, with terms I and Q. Then, the feature extraction may determine features based on, but not limited to, edit distance, word matches, length differences, cosine similarity (between pairs of entities using vector representation built from unstructured text, where the documents contain the name and synonym of the entity pair), as well as features based on attributes of the entities, if necessary, such as percentage overlap in values of other attributes (e.g., for drugs: adverse effects, target protein information), etc. The vector representation, by way of example, may be represented as $f(authority_{ij}, synonym_{ij})$ for an (authoritative name, synonym) pair listed in source i for concept j. Possible features may include contexts in which both $authority_{ij}$ and $synonym_{ij}$ co-occur in unstructured text.

At step 308, each entity pair is treated as a singleton cluster, and the similarity between clusters is computed at step 310 using vector representations of entity pairs. The similarity may be determined based on various techniques, including, but not limited to: cosine similarity, $Sim_x$ (e.g., $Cos(f(authority_{ij}, synonym_{ij}), f(authority_{mn}, synonym_{mn}))$; edit distance, $Sim_y$ (e.g., max (editdistance($authority_{ij}$, $authority_{mn}$), editdistance($authority_{mn}$, $synonym_{ij}$), editdistance($synonym_{mn}$, $authority_{ij}$))); and overall similarity based on a combination or interpolation of various similarity functions (e.g., $\Sigma_r(\lambda_r, Sim_r)$), where i and m represent sources, j and n represent concepts, Sim represents similarity functions, r represents an entity pair, and $\lambda$ represents an interpolation parameter.

Based on the similarity, the two closest clusters are identified at step 312. If the similarity between the identified closest clusters is greater than a user-defined (or intracluster) threshold as determined at step 314, the two clusters are merged at step 316. The merging process is repeated to identify and merge the closest clusters until two identified closest clusters have a similarity that does not meet the user-defined threshold.

A dataset may be generated to store the merged paired terms, where similarity between clusters in the dataset is lower than a user-defined (or intercluster) threshold. For example, if Pair 1 (A and X), Pair 4 (D and R), and Pair 7 (G and U) are found to be associated with a first common term, these pairs may be merged into Group 1. Meanwhile, if Pair 2 (B and Y), Pair 3 (C and Z), and Pair 6 (F and T) are found to be associated with a second common term, and pair 8 (H and V) and Pair 9 (I and Q) are found to be associated with a third common term, these pairs may be merged into Group 2 and Group 4, respectively. Meanwhile, if Pair 5 (E and S) is not found to share a common term with any other pairs, Pair 5 may be stored in its own group: Group 3.

Thus, given 'n' data sources with just <synonym,authority> information, if groups have overlapping synonyms (e.g., as in the above example where RA is a synonym of two data source provided authority nodes, Rheumatoid Arthritis and Refractory Anemia), groups of concepts are produced such that intercluster (between clusters) similarity is lower than a first threshold, th1, and intracluster (within cluster) similarity is higher than a second threshold, th2. The thresholds, th1 and th2 may be set based on the required granularity. Any clustering approach may be utilized (e.g., agglomerative clustering with stopping criteria based on th1 and th2, etc.)

Figure 4:
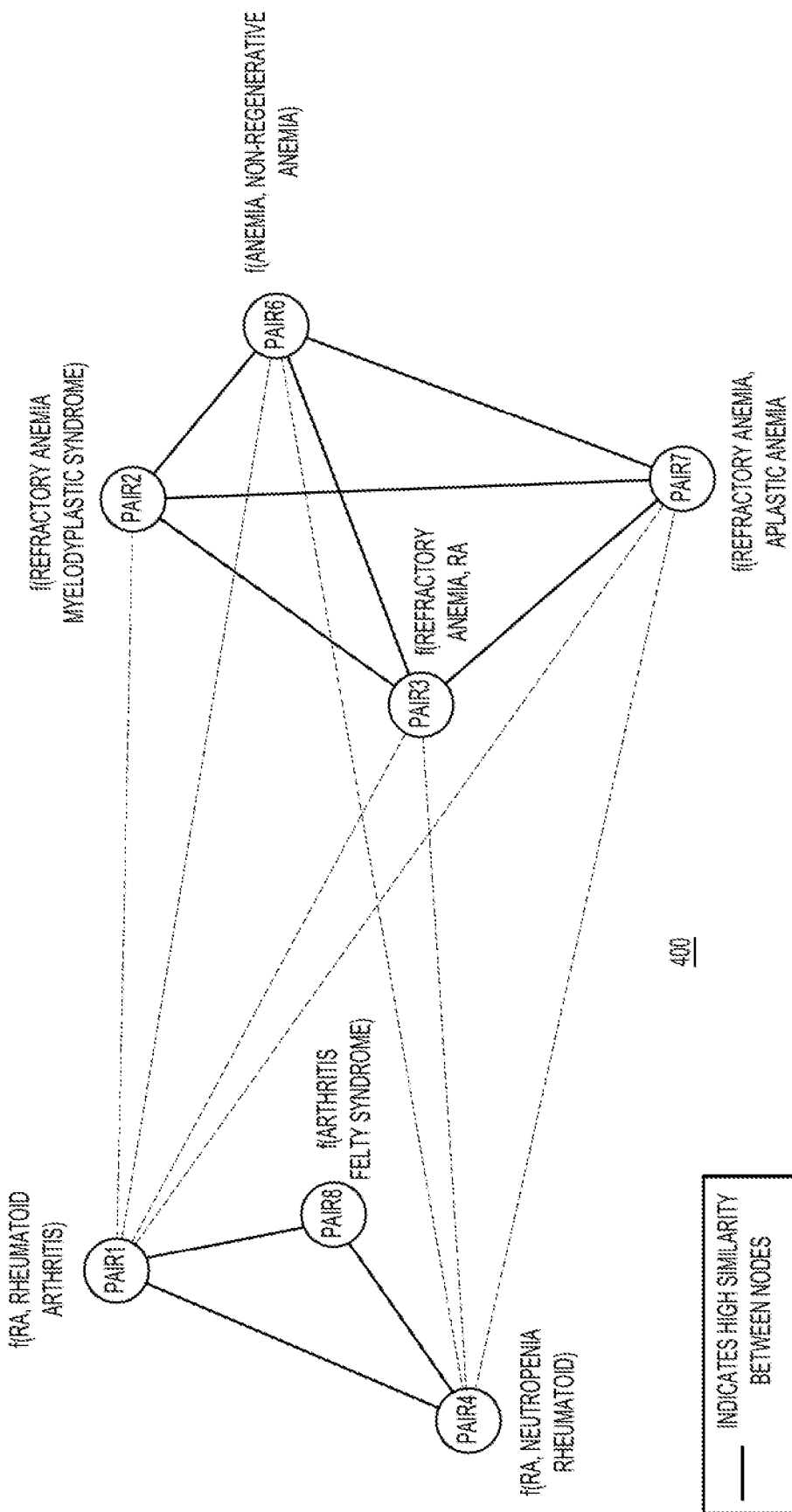
FIG. 4 is a diagram illustrating operations for determining a similarity between entity pairs, according to a present invention embodiment.

Now referring to FIG. 4 for a description of diagram 400, which illustrates an example embodiment of determining similarity with hierarchical clustering. In particular, this particular diagram depicts vector representations for different paired entities, where $f(authority_{ij}, synonym_{ij})$ is a vector representation for an authoritative name-synonym pair listed in source i for concept j, where there are 'n' sources with just <synonym, authority> information. The algorithm considers features that describe contexts in which both $authority_{ij}$ and $synonym_{ij}$ co-occur in unstructured text.

More specifically, similarity may be determined based on, but not limited to: $Sim_x$: based on cosine similarity (e.g., $Cos(f(authority_{ij}, synonym_{ij}), f(authority_{mn}, synonym_{mn}))$; $Sim_y$: edit distance (e.g., max (editdistance($authority_{ij}$, $authority_{mn}$), editdistance($authority_{mn}$, $synonym_{ij}$), editdistance($synonym_{mn}$, $authority_{ij}$))); and overall similarity, such as interpolation of various similarity functions $\Sigma_r(\lambda_r, Sim_r)$ as described above.

The goal of the clustering statistical algorithm is to determine if groups have overlapping synonyms (e.g., RA is a synonym of two data source provided authority nodes-Rheumatoid Arthritis and Refractory Anemia). Consequently, the algorithm may produce groups of concepts such that intercluster (between clusters) similarity is lower than threshold th1 and intracluster (within cluster) similarity is higher than threshold th2. Each threshold (th1, th2) may be set based on the required granularity and any clustering approach may be applied to achieve these groups of concepts (e.g., agglomerative clustering with stopping criteria based on th1 and th2).

Figure 5:
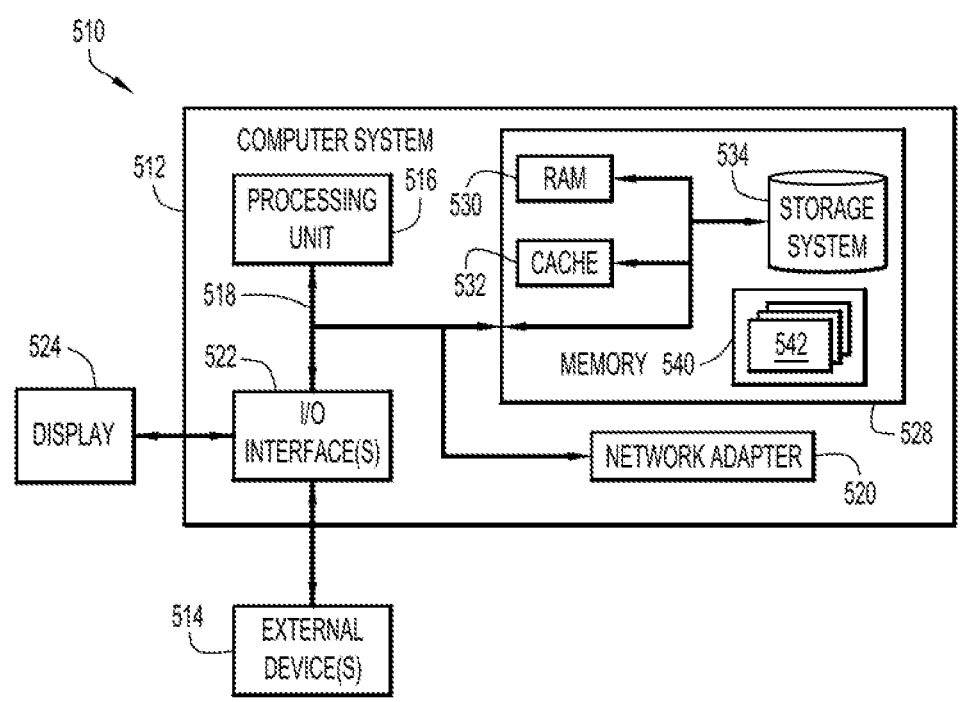
FIG. 5 is a block diagram of a computing node according to an embodiment of the present invention.

Referring now to FIG. 5, a schematic of an example of a computing node or device 510 for computer environment 100 (e.g., server systems 10 and client systems 14, etc.) is shown. The computing node or device 510 is only one example of a suitable computing node for computing environment 100 and is not intended to suggest any limitation as to the scope of use or functionality of embodiments of the invention described herein. Regardless, computing node 510 is capable of being implemented and/or performing any of the functionality set forth herein.

In computing node 510, there is a computer system 512 which is operational with numerous other general purpose or special purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, computer system 512 is shown in the form of a general-purpose computing device. The components of computer system 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 512 typically includes a variety of computer system readable media. Such media may be any available media that is accessible by computer system 512, and it includes both volatile and non-volatile media, removable and non-removable media.

System memory 528 can include computer system readable media in the form of volatile memory, such as random access memory (RAM) 530 and/or cache memory 532. Computer system 512 may further include other removable/non-removable, volatile/non-volatile computer system storage media. By way of example only, storage system 534 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 (e.g., including synonym aggregation module 16) generally carry out the functions and/or methodologies of embodiments of the invention as described herein.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via Input/Output (I/O) interfaces 522. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

The techniques provided herein have a number of advantages. Most notably, the techniques presented herein accurately identify synonymous terms from paired entities in multiple structured sources. Consequently, these techniques may free up computing power and improve processing by reducing the number of queries required for a particular operation. Moreover, the techniques provided herein may reduce the number of errors returned in data processing operations. As another example advantage, since the techniques provided herein can identify similarities based on only entity-dependent features, the amount of processing required for queries can be reduced. Put generally, the techniques provided herein resolve a problem (accurately identifying synonymous terms) that is rooted in a computing environment.

It will be appreciated that the embodiments described above and illustrated in the drawings represent only a few of the many ways of implementing embodiments for identifying synonymous paired entities in a domain and generating a dataset that improves query results in the domain.

The environment of the present invention embodiments may include any number of computer or other processing systems (e.g., client or end-user systems, server systems, etc.) and data sources arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, synonym aggregation module, etc.). These systems may include any types of monitors and input devices (e.g., keyboard, mouse, voice recognition, etc.) to enter and/or view information.

It is to be understood that the software (e.g., synonym aggregation module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., synonym aggregation module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., extracted features, models generated with the similarity algorithm, etc.). The database system may be implemented by any number of any conventional or other databases, data stores or storage structures (e.g., files, databases, data structures, data or other repositories, etc.) to store information (e.g., extracted features, models generated with the similarity algorithm, etc.). The database system may be included within or coupled to the server and/or client systems. The database systems and/or storage structures may be remote from or local to the computer or other processing systems, and may store any desired data (e.g., extracted features, models generated with the similarity algorithm etc.).

The present invention embodiments may employ any number of any type of user interface (e.g., Graphical User Interface (GUI), command-line, prompt, etc.) for obtaining or providing information (e.g., for submitting a data set or for submitting a query to the database generated based on the techniques provided herein), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a dataset of merged synonymous data elements comprising:
   receiving a first set of paired terms from a first authoritative source for a domain, wherein each of the paired terms of the first set includes an entity name and a corresponding predetermined synonym;

receiving a second set of paired terms from a second authoritative source for the domain, wherein each of the paired terms of the second set includes an entity name and a corresponding predetermined synonym;

comparing the first set of paired terms to the second set of paired terms with a similarity assessment based on a clustering statistical algorithm to identify paired terms from the first set of paired terms that share a synonymous term with one or more paired terms from the second set of paired terms, wherein the shared synonymous term includes one of the entity name and the corresponding predetermined synonym of a corresponding one of the identified paired terms, wherein the shared synonymous term of at least one of the identified paired terms is ambiguous and refers to a plurality of distinct concepts, and wherein the comparing includes:

generating a vector representation of the entity name and corresponding predetermined synonym of each of the paired terms based on extracted features of the paired terms, wherein each of the paired terms represents a different cluster within a group of clusters for the paired terms; and performing a clustering process to merge the paired terms associated with a plurality of closest clusters within the group, wherein the clustering process includes:

determining a similarity between the clusters within the group based on the vector representations of the paired terms;

identifying the closest clusters within the group based on the similarity; and merging the paired terms of the identified closest clusters within the group in response to the similarity of the identified closest clusters satisfying a first threshold;

wherein the clustering process is performed on the group until the similarity of the identified closest clusters of the group fails to satisfy the first threshold to maintain the clusters of the group associated with the distinct concepts;

generating a dataset from the clusters that associates a normalized version of a synonymous term with any terms included in the merged paired terms, wherein similarity between merged clusters within the dataset satisfies the first threshold and similarity within the merged clusters satisfies a second threshold, wherein each of the distinct concepts of the ambiguous shared synonymous term of the at least one of the identified paired terms is associated with a different one of the clusters and the first and second thresholds are set to values to assign each of the identified paired terms with the shared synonymous term to one of the clusters associated with the distinct concepts, and wherein at least one of the paired terms from a collection of paired terms including a same ambiguous shared synonymous term is assigned to a different cluster than remaining ones of the paired terms in the collection; and processing a query with one or more search terms by identifying the clusters of the dataset with a normalized version of the synonymous term associated with the one or more search terms and retrieving results for the query based on the one or more search terms and synonyms of the identified clusters of the dataset.

2. The computer-implemented method of claim 1, wherein the first authoritative source and the second authoritative source are each structured data sources and lack unified identifiers.

3. The computer-implemented method of claim 1, wherein the domain is life science and the synonyms are alternative names for life science entities.

4. An apparatus for generating a dataset of merged synonymous data elements comprising:

at least one processor configured to:

receive a first set of paired terms from a first authoritative source for a domain, wherein each of the paired terms of the first set includes an entity name and a corresponding predetermined synonym;

receive a second set of paired terms from a second authoritative source for the domain, wherein each of the paired terms of the second set includes an entity name and a corresponding predetermined synonym;

compare the first set of paired terms to the second set of paired terms with a similarity assessment based on a clustering statistical algorithm to identify paired terms from the first set of paired terms that share a synonymous term with one or more paired terms from the second set of paired terms, wherein the shared synonymous term includes one of the entity name and the corresponding predetermined synonym of a corresponding one of the identified paired terms, wherein the shared synonymous term of at least one of the identified paired terms is ambiguous and refers to a plurality of distinct concepts, and wherein the comparing includes:

generating a vector representation of the entity name and corresponding predetermined synonym of each of the paired terms based on extracted features of the paired terms, wherein each of the paired terms represents a different cluster within a group of clusters for the paired terms; and performing a clustering process to merge the paired terms associated with a plurality of closest clusters within the group, wherein the clustering process includes:

determining a similarity between the clusters within the group based on the vector representations of the paired terms;

identifying the closest clusters within the group based on the similarity; and merging the paired terms of the identified closest clusters within the group in response to the similarity of the identified closest clusters satisfying a first threshold;

wherein the clustering process is performed on the group until the similarity of the identified closest clusters of the group fails to satisfy the first threshold to maintain the clusters of the group associated with the distinct concepts;

generate a dataset from the clusters that associates a normalized version of a synonymous term with any terms included in the merged paired terms, wherein similarity between merged clusters within the dataset satisfies the first threshold and similarity within the merged clusters satisfies a second threshold, wherein each of the distinct concepts of the ambiguous shared synonymous term of the at least one of the identified paired terms is associated with a different one of the clusters and the first and second thresholds are set to values to assign each of the identified paired terms with the shared synonymous term to one of the clusters associated with the distinct concepts, and wherein at least one of the paired terms from a collection of paired terms including a same ambiguous shared synonymous term is assigned to a different cluster than remaining ones of the paired terms in the collection; and process a query with one or more search terms by identifying the clusters of the dataset with a normalized version of the synonymous term associated with the one or more search terms and retrieving results for the query based on the one or more search terms and synonyms of the identified clusters of the dataset.

5. The apparatus of claim 4, wherein the first authoritative source and the second authoritative source are each structured data sources and lack unified identifiers.

6. The apparatus of claim 4, wherein the domain is life science and the synonyms are alternative names for life science entities.

7. A computer program product for generating a dataset of merged synonymous data elements, the computer program product comprising a computer readable storage medium having program instructions embodied therewith, the program instructions executable by at least one processor to cause the at least one processor to:

receive a first set of paired terms from a first authoritative source for a domain, wherein each of the paired terms of the first set includes an entity name and a corresponding predetermined synonym;

receive a second set of paired terms from a second authoritative source for the domain, wherein each of the paired terms of the second set includes an entity name and a corresponding predetermined synonym;

compare the first set of paired terms to the second set of paired terms with a similarity assessment based on a clustering statistical algorithm to identify paired terms from the first set of paired terms that share a synonymous term with one or more paired terms from the second set of paired terms, wherein the shared synonymous term includes one of the entity name and the corresponding predetermined synonym of a corresponding one of the identified paired terms, wherein the shared synonymous term of at least one of the identified paired terms is ambiguous and refers to a plurality of distinct concepts, and wherein the comparing includes:

generating a vector representation of the entity name and corresponding predetermined synonym of each of the paired terms based on extracted features of the paired terms, wherein each of the paired terms represents a different cluster within a group of clusters for the paired terms; and performing a clustering process to merge the paired terms associated with a plurality of closest clusters within the group, wherein the clustering process includes:

determining a similarity between the clusters within the group based on the vector representations of the paired terms;

identifying the closest clusters within the group based on the similarity; and merging the paired terms of the identified closest clusters within the group in response to the similarity of the identified closest clusters satisfying a first threshold;

wherein the clustering process is performed on the group until the similarity of the identified closest clusters of the group fails to satisfy the first threshold to maintain the clusters of the group associated with the distinct concepts;

generate a dataset from the clusters that associates a normalized version of a synonymous term with any terms included in the merged paired terms, wherein similarity between merged clusters within the dataset satisfies the first threshold and similarity within the merged clusters satisfies a second threshold, wherein each of the distinct concepts of the ambiguous shared synonymous term of the at least one of the identified paired terms is associated with a different one of the clusters and the first and second thresholds are set to values to assign each of the identified paired terms with the shared synonymous term to one of the clusters associated with the distinct concepts, and wherein at least one of the paired terms from a collection of paired terms including a same ambiguous shared synonymous term is assigned to a different cluster than remaining ones of the paired terms in the collection; and process a query with one or more search terms by identifying the clusters of the dataset with a normalized version of the synonymous term associated with the one or more search terms and retrieving results for the query based on the one or more search terms and synonyms of the identified clusters of the dataset.

8. The computer program product of claim 7, wherein the first authoritative source and the second authoritative source are each structured data sources and lack unified identifiers.

9. The computer program product of claim 7, wherein the domain is life science and the synonyms are alternative names for life science entities.

10. The computer program product of claim 7, wherein each of the paired terms is associated with a set of attributes for the entity and corresponding predetermined synonym, and the vector representation is further generated based on features extracted from the set of attributes.

11. The computer program product of claim 10, wherein the features extracted from the set of attributes include a percentage of overlap in values of corresponding attributes.

12. The computer-implemented method of claim 1, wherein each of the paired terms is associated with a set of attributes for the entity and corresponding predetermined synonym, and the vector representation is further generated based on features extracted from the set of attributes.

13. The computer-implemented method of claim 12, wherein the features extracted from the set of attributes include a percentage of overlap in values of corresponding attributes.

14. The apparatus of claim 4, wherein each of the paired terms is associated with a set of attributes for the entity and corresponding predetermined synonym, and the vector representation is further generated based on features extracted from the set of attributes.

15. The apparatus of claim 14, wherein the features extracted from the set of attributes include a percentage of overlap in values of corresponding attributes.

* * * * *